Feb. 10, 1970 V. R. SAARI 3,495,233

LAST STAGE OF A STAGE BY STAGE ENCODER

Filed Dec. 28, 1966 2 Sheets-Sheet 1

INVENTOR
V. R. SAARI
BY Leonard D. Arnold
ATTORNEY

Feb. 10, 1970 V. R. SAARI 3,495,233

LAST STAGE OF A STAGE BY STAGE ENCODER

Filed Dec. 28, 1966 2 Sheets-Sheet 2

United States Patent Office 3,495,233

Patented Feb. 10, 1970

3,495,233

LAST STAGE OF A STAGE BY STAGE ENCODER

Veikko R. Saari, Old Bridge, N.J., assignor to Bell Telephone Laboratories, Incorporated, Murray Hill and Berkeley Heights, N.J., a corporation of New York Filed Dec. 28, 1966, Ser. No. 605,335
Int. Cl. H04l 3/00; H03k 13/00
U.S. Cl. 340—347 4 Claims This invention relates to a final stage for a stage by stage balanced encoder which employs a single operational amplifier in combination with differential amplifiers and bistable circuits to derive the same number of digits of the digital signal as two stages of conventional balanced encoders employing a total of four operational amplifiers. Since the operational amplifiers employed in stage by stage encoders are relatively expensive and complex the elimination of three of them substantially reduces the cost of the encoder.

United States Patent 2,632,058 which issued to F. Gray on Mar. 17, 1953, describes a coding technique that offers certain distinct advantages over the conventional binary code. These advantages follow from the particular characteristic of the Gray code, that no two successive numbers differ by more than a single digit. The Gray code is also called the reflected-binary code, due to the manner in which the code is formed.

One technique for forming reflected-binary code groups from analog signals is particularly advantageous and has been embodied in the "stage by stage" encoder. United States Patent 3,035,258, which issued to N. E. Chasek on May 15, 1962, described such an encoder having many tandem encoding stages (one for each digit in the code word). Each of these stages has an analog input, analog output, and digit output. The analog output of the first stage is the analog input of the next, and so on. The stages exhibit a V-shaped transfer characteristic between the analog input and analog output. Conventional full wave bridge rectifiers in each stage yield this transfer characteristic and digit output means responsive to the conductivity state of one of the rectifier diodes determine the polarity of the input signal to each stage.

Improved stage by stage encoding circuitry is described in United States Patent 3,187,325 which issued to F. D. Waldhauer on June 1, 1965. As contemplated therein the desired V-shaped, or full-wave rectifier transfer characteristic is developed on a piecewise basis, that is, the two legs of the V are generated separately by an encoding network and subsequently combined. Each half of the desired characteristic is generated by means of an amplifier whose input terminal is the analog input terminal and which has a feedback path comprising the serially connected combination of a nonlinear impedance element and a resistor. An analog output is obtained from the junction of the nonlinear element and the resistor, and the binary, or digit output, is obtained from the output of the amplifier. Each amplifier has a pair of dissimilar feedback paths, each of which develops one-half the required transfer characteristic so that the resulting stage functions as a binary stage of a stage by stage encoder. The stage by stage encoder is constructed by connecting the analog output from the first stage to the analog input of the next stage, and so on, and the encoded binary digit symbols appear in parallel at the digit outputs of the several stages. Each of the stages in the encoder is characterized in that the "analog output versus analog input" transfer characteristic processes a V shape. In addition, the digit output of each stage receives a voltage indicative of a first symbol whenever the input signal amplitude is less than a predetermined threshold level and receives a different voltage representing a second symbol whenever the analog input signal is larger than the threshold level.

Copending application Ser. No. 517,339, filed in my name on Dec. 29, 1965, discloses a so-called quaternary stage which can perform the same operations as two binary stages in a stage by stage encoder. It uses precision resistors and switching diodes in four feedback paths around a high gain operational amplifier and derives from an input current an output current that traces a continuous range of values four times in response to one full traversal of the input current range. Since each quaternary stage costs approximately half as much as the two binary stages it replaces, a substantial cost saving is involved.

Preferred embodiments of encoders using either the binary or the quaternary encoding stage are connected in a so-called balanced encoder arrangement. In a balanced encoder each stage is made up of two networks, of either the quaternary or binary type, which operate in phase opposition. That is when the output of one operational amplifier is positive the output of its complementary amplifier in the same stage is negative. Balanced encoders of this type are described in both the Waldhauer patent and the above mentioned copending application.

In the balanced encoder employing binary stages the last stage produces the least significant digit output signal and the next to last stage produces the next most significant digit. The last stage can consist of a single operational amplifier. As a result, in order to obtain the two least significant digits in a balanced encoder employing binary stages three operational amplifiers are required. The last three digits are generated with five operational amplifiers. Where the balanced encoder makes use of the so-called quaternary encoding stage, the last stage, which uses two operational amplifiers, generates the two least significant digits while the next two significant digits are generated by the preceding stage. The balanced quatenary encoder therefore requires four operational amplifiers in order to generate the four least significant digits.

The most expensive part of each such binary encoding stage is the operational amplifier, which uses several active devices, and elaborate biasing and feedback-shaping networks. The cost of a stage by stage encoder can be substantially reduced by using fewer operational amplifiers.

It is, accordingly, an object of this invention to reduce the number of operational amplifiers required in a stage by stage encoder.

The invention will be more fully comprehended from the following detailed description taken in conjunction with the drawings in which.

Figure 1:
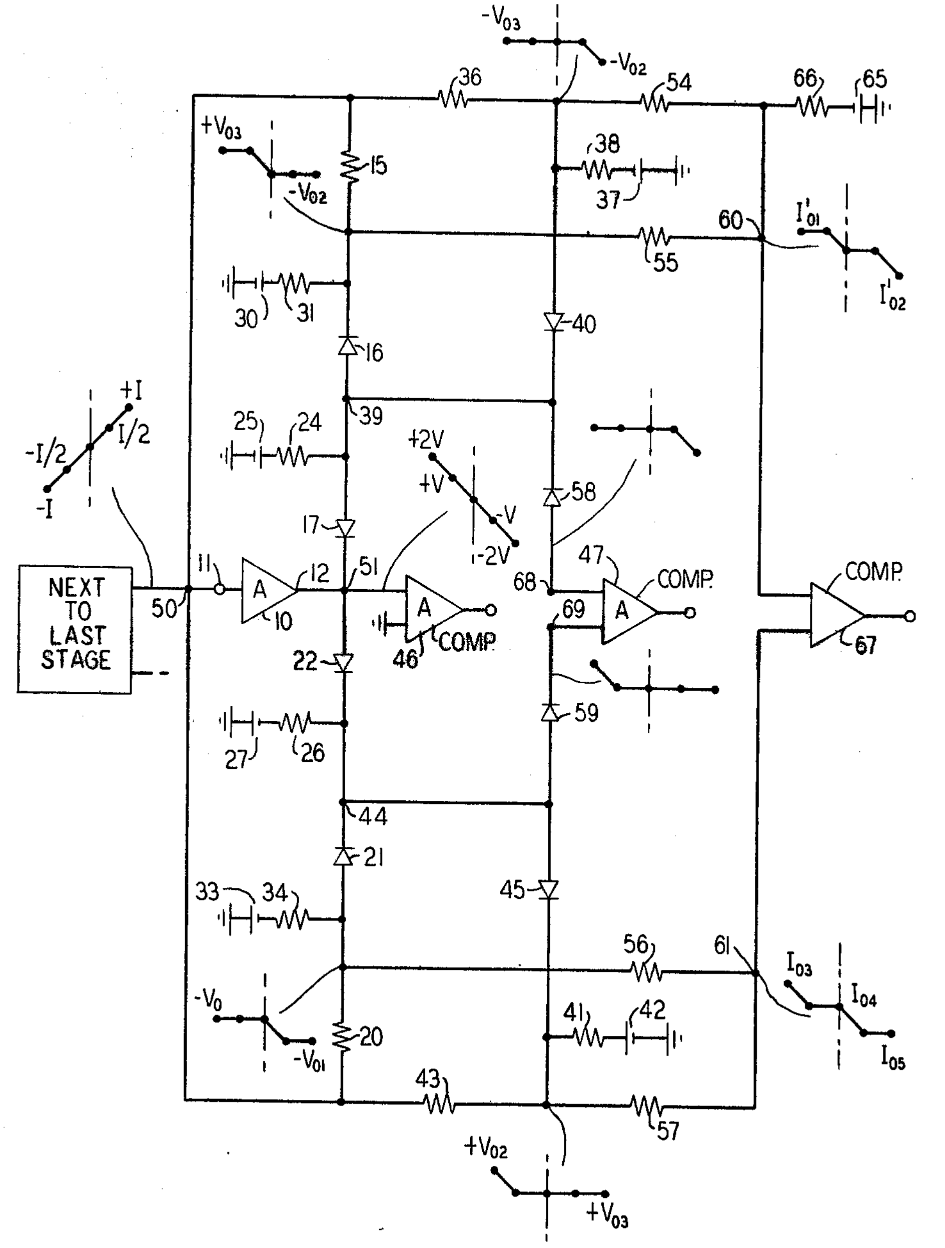
FIG. 1 is a diagram partially in block form of a last stage for a stage by stage encoder embodying this invention which derives the three least significant digits.

The present invention provides circuit means for realizing the digits of the encoded signal which heretofore have been generated by the last two or three stages of a balanced stage by stage encoder. The last stage of a stage by stage encoder embodying this invention is shown in FIG. 1 and comprises an amplifier 10 having an input 11 and an output 12, and having four feedback networks. A first feedback network comprises a resistor 15, and two diodes 16 and 17 connected in a series circuit between the output 12 and the input 11 of the amplifier. Diode 16 is poled in the direction of positive current flow from output 12 to input 11, and diode 17 is poled in the opposite direction. A similar feedback circuit comprising a resistor 20 and diodes 21 and 22 is also provided between the output 12 and the input 11. Diode 21 is poled to conduct current from input 11 to output 12 while diode 22 is poled in the opposite direction. As shown in FIG. 1, the cathode of diode 17 and the anode of diode 22 are connected to the output terminal 12. A first current biasing network comprising the series connected resistor 24 and battery 25 is provided between the anode of diode 17 and ground. A second such biasing circuit comprising resistor 26 and battery 27 is connected between the cathode of diode 21 and ground. In addition, the cathode of diode 16 is positively biased by means of a battery 30 connected to its cathode by means of resistor 31. A similar circuit comprising battery 33 and resistor 34 negatively biases the anode of diode 21.

Two additional feedback networks are provided. The first is the series connection of a diode 40 and a resistor 36 connected between the junction 39 of diodes 16 and 17 and input terminal 11. Diode 40 is poled in the direction of positive current flow from input terminal 11 to junction 39. A series connected battery 37 and a resistor 38 serve to back bias diode 40. The other feedback network comprises the series connected of diode 45 and resistor 43 connected between the junction 44 of diodes 21 and 22 and input terminal 11. Diode 45 is poled to conduct positive current from junction 44 to input terminal 11 and a battery 42 is connected by means of resistor 41 to back bias diode 45.

Input signals from one analog output terminal of a balanced next to last stage of either the binary or quaternary type are applied to network input terminl 50 which is directly connected to the input 11 of amplifier 10. The network has five output terminals. The first of these output terminals, terminal 51, is directly connected to the output terminal 12 of amplifier 10. The second output terminal is at the point 39, the junction of diodes 16 and 17, while the third output terminal is at the junction 44 of diodes 21 and 22. The fourth and fifth output terminals 60 and 61 are summing points which are at a virtual zero voltage with respect to ground. The output signal current at output terminal 60 is proportional to the sum of the output signal currents at the anode of diode 40 and the cathode of diode 16 and is obtained by means of the connection to terminal 60 of these electrodes by means of resistors 54 and 55, respectively. Similarly, resistors 56 and 57 sum the signals at the anode of diode 21 and cathode of diode 45 at output terminal 61.

Briefly stated, in accordance with this invention the feedback networks, together with the summing resistors, are designed to cause the output signal at output terminal 51 to be above or below a predetermined threshold level in accordance with whether the third least significant digit of the code, corresponding to the encoder analog input is either a pulse or a space and to generate signals at terminals 68 and 69, in a manner to be described hereinafter, which may be subtracted from one another so that the resulting signal is greater or less than a predetermined threshold in accordance with whether the second least significant digit is a pulse or a space. In addition, the output signals at terminals 60 and 61 are similarly capable of producing the least sigificant digit of the code.

The input 11 of operational amplifier 10 is at substantially ground potential. This results from the fact that amplifier 10 has a high voltage gain and that substantial negative feedback is applied. Accordingly, when the voltage at the amplifier output 12 is finite, all but a negligible part of the input current flows through the feedback network rather than into amplifier 10. The fact that the amplifier input 11 is substantially at ground potential and that amplifier 10 produces one phase reversal should be borne in mind in considering the description which follows.

When the input signal at terminal 50 taken from one of the two analog outputs of the next to last stage is at zero current, the output 12 of the amplifier is at zero voltage and diodes 17 and 22 conduct strongly so that current from biasing sources 25 and 27 flows through these diodes. When the input signal goes slightly positive, that is, when a current is injected into the input 11 of amplifier 10, the signal at the output terminal 12 becomes negative. Since diode 22 is conducting strongly and therefore presents a relatively low impedance, there is nearly constant voltage across it, and the voltage at junction 44 therefore undergoes a like negative change. Diode 21 then begins to conduct because the voltage at its cathode electrode, which closely follows the output of the amplifier, is negative with respect to its anode by an amount sufficient that the difference exceeds the knee voltage of said diode.

As a result, incremental current flows through resistors 20 and 56 connected to the anode of diode 21 and the voltage at the anode of diode 21 drops in a linear relationship with the input. This drop in voltage continues until the sum of the current supplied through resistor 56 from the networks connected to terminal 61, and the current supplied through resistor 20 from the input 50 is substantially equal to the current drawn by battery 27. Substantially all the current of battery 27 is then being drained through diode 21, and little or no current flows through diode 22 which is now a high impedance. The output of diode 21 is then effectively clamped to a voltage $-V_{01}$, as illustrated, and this occurs when the input current is at (or above) a value of $+I/2$.

When the input current is at $+I/2$ units or greater the voltage at the amplifier output 12 is then sufficiently negative to substantially forward bias diode 40 which had been back biased by source 37. Diode 40 then begins to conduct and the voltage at its anode which is connected to output terminal 60 by resistor 54 drops in a linear relationship with the input. As the input current increases the voltage at the anode of diode 40 continues to drop because the amplifier output continues to drop. When the input current is between $+I/2$ and $+I$ units of current, the voltage at the anode of diode 21 remains clamped to $-V_{01}$ volts.

For input signals of increasingly negative current, the operation of the corresponding symmetrcal circuitry is similar to that described above. Diode 16 first begins conducting and the voltage at its cathode rises towards $+V_{03}$ volts. This action continues until diode 17 is back biased at which time the current flowing through resistors 15 and 55 is equal to the bias current supplied by source 25. The cathode of diode 16 is then clamped to $+V_{03}$ volts, in the same manner as described above, that the anode of diode 21 was clamped to $-V_{01}$ volts. This occurs when the input current is at $-I/2$ units.

When the input current is more negative than $-I/2$ units, the voltage at the output 12 of amplifier 10 is sufficiently positive to substantially forward bias diode 45, and as a result the voltage at its cathode, which is connected to output terminal 61 by means of a resistor 57, rises towards $+V_{02}$ volts. The voltage is limited to $+V_{02}$ volts because in the preferred application of the invention the input stops increasing or else reverses its direction when that point has been reached.

For convenience the output voltages and currents generated by the circuit are shown (as functions of the input current) at the various output terminals in FIG. 1. To simplify an understanding of these waveforms, a dashed vertical line has been drawn through the input current waveform at zero units of current and four dots are used to denote four values of the input current. The two positive values $+I/2$ and $+I$ are indicated by two equally spaced dots to the right of the vertical line and two equally spaced dots to the left of the vertical line indicate the two negative values $-I/2$, and $-I$. A vertical line is also shown passing through each of the output signal waveforms. This line is to be understood to indicate the value of the output voltage or current, as indicated, when the input current is at zero units. The first dot to the right of the vertical line in an output voltage waveform is the voltage or current when the input current is at $+I/2$ units of current and the voltage or current at the second dot to the right is the voltage when the input signal is at $+I$ units. Similarly, the first and second dots to the left of the vertical line in an output voltage waveform indicate the voltages or currents which exist for input currents of $-I/2$ units and $-I$ units, respectively.

Critical examination of the output waveforms shown in FIG. 1 yields some interesting results. First of all the output signal at terminal 51 is identical to that at the first digit output terminal of the quaternary encoding stage shown in FIG. 1 of the above mentioned copending application. Second, if the signals at the anode of diode 58 and the cathode of diode 59 are subtracted from one another the resulting signal is identical to that at the second digit output terminal of the encoding stage shown in FIG. 1 of the above mentioned copending application. This may be most easily accomplished by applying the signals at the anode of diode 58 and the cathode of diode 59 to a differential amplifier circuit which performs the subtraction. The resulting signal at the output of the differential amplifier is then used to drive a bistable circuit which produces the digit output signal. Comparator 47 is the tandem connection of a differential amplifier and a bistable circuit. Finally, as will be explained in detail below, if the signals available at terminals 60 and 61 are first subtracted from one another the resulting signal assumes a value which is above or below a predetermined threshold level in accordance with whether the least significant digit of the analog signal to be encoded is a pulse or a space. The output of the differential amplifier, representing the least significant digit, may then be connected to a bistable circuit which generates a pulse or a space in accordance with whether the difference signal is above or below the threshold level. Comparator 67 is the tandem connection of a differential amplifier and a bistable circuit.

Figure 3:
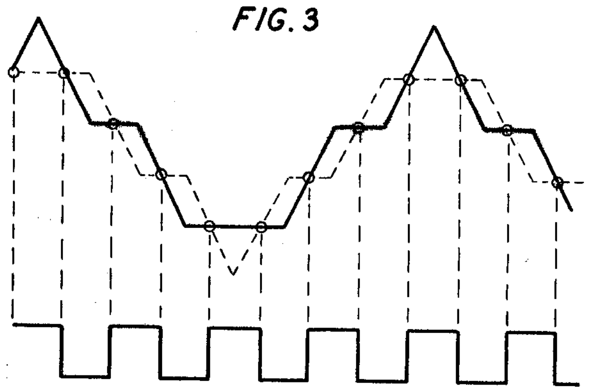
FIG. 3 illustrates some of the transfer functions present in the circuitry shown in FIG. 2.

FIG. 3 illustrates the waveforms at output terminals 60 and 61 respectively. The dotted line is the waveform present at output terminal 60 while the solid line is the output waveform at terminal 61. In order that the comparator circuit 67 generate the least significant digit at the same time that all the other digit output signals are generated by the stage by stage encoder the signals must cross each other at the points encircled in the figure since these points are the switching points of the least significant digit. To accomplish this end, resistor 66 must be set at a predetermined value.

Figure 2:
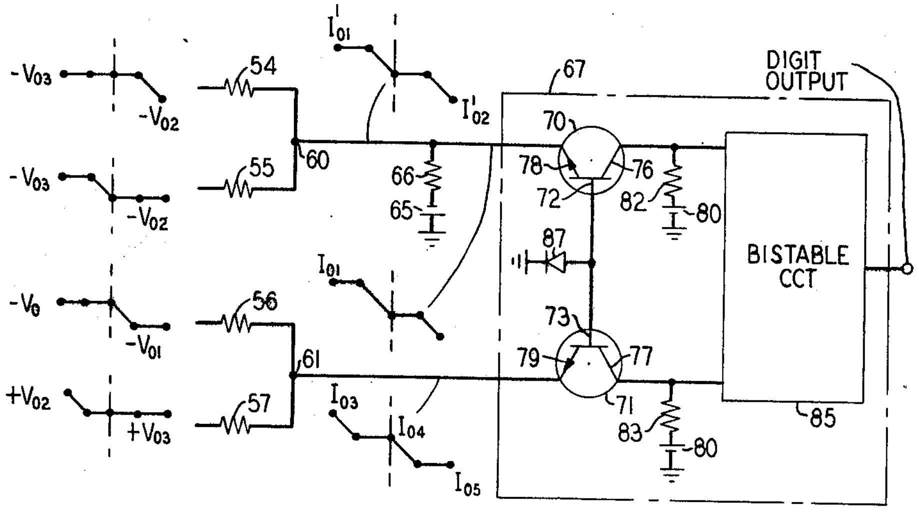
FIG. 2 is a diagram partially in block form and partially in schematic form of the circuitry of FIG. 1 used to derive the least significant digit.

FIG. 2 shows in somewhat more specific form the comparator circuit 67 and the input signals applied thereto. The differential input portion of the comparator circuit 84 comprises two transistors 70 and 71 whose base electrodes 72 and 73 respectively are directly connected together and also to ground by means of diode 87. A source of positive bias voltage 80 is connected to the collector electrodes 76 and 77 by means of resistors 82 and 83, respectively. The signal from output terminal 60 is connected to the emitter electrode 78 of transistor 70 while terminal 61 is connected to the emitter electrode 79 of transistor 71. Since the differential input circuit is base-coupled, it has a low input impedance which develops a negligible voltage drop. The input currents applied to the emitter electrodes are shown in FIG. 2 and these currents are defined by the equations shown below:

$$I_{01}'=\frac{V_{01}-V_{03}}{R} \qquad (1)$$

$$I_{02}'=\frac{V_0-V_{02}}{R} \qquad (2)$$

$$I_{01}=\frac{V_{01}-V_{03}}{R}-\frac{V_R}{R_1} \qquad (3)$$

$$I_{04}=\frac{V_{03}-V_0}{R} \qquad (4)$$

$$I_{03}=\frac{V_{02}-V_0}{R} \qquad (5)$$

$$I_{05}=\frac{V_{03}-V_{01}}{R} \qquad (6)$$

where $V_R$ is the value of the voltage of source 65, R is the value of each of the resistors 54, 55, 56, and 57, and $R_1$ is the value of a resistor 66. The value $R_1$, namely the resistance of resistor 66, must be chosen so that the inputs crisscross at the points indicated by the circles in FIG. 3. At the first such point $$I_{01}=I_{04}+\tfrac{1}{2}(I_{03}-I_{04})=\tfrac{1}{2}(I_{03}+I_{04}) \qquad (7)$$

and $$\therefore \frac{V_{01}-V_{03}}{R}-\frac{V_R}{R_1}=\frac{\tfrac{1}{2}V_{02}+\tfrac{1}{2}V_{03}-V_0}{R} \qquad (8)$$

$$R_1=\frac{RV_R}{V_{01}+V_0-\tfrac{1}{2}V_{02}-\tfrac{3}{2}V_{03}} \qquad (9)$$

The collector electrodes 76 and 77 of transistors 70 and 71 are connected to the inputs of a bistable circuit 85 so that the output signal at collector electrode 76 of transistor 70 sets the bistable circuit and the signal present at the collector electrode 77 of transistor 71 resets the bistable circuit.

The other comparator circuits 46 and 47 (FIG. 1) do not necessarily require a low input impedance differential amplifier stage so that a more general differential amplifier followed by a bistable circuit may be used to form those comparator circuits.

Figure 4:
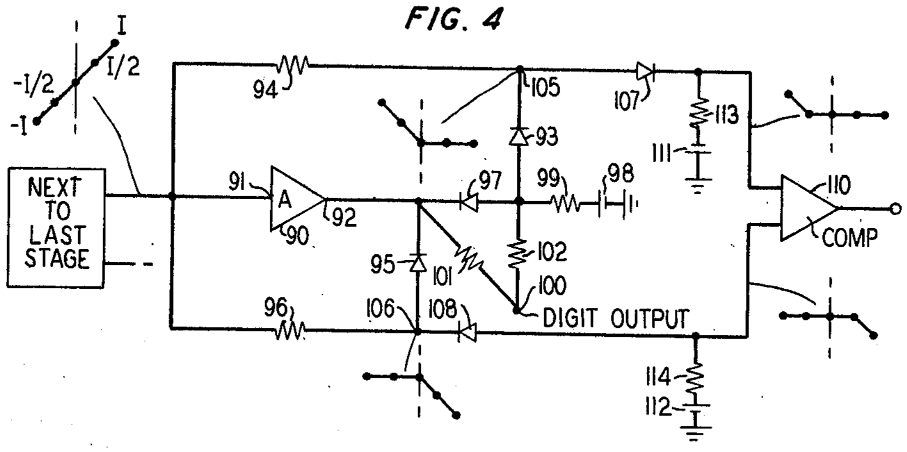
FIG. 4 is a diagram partially in block form of a last stage for a stage by stage encoder embodying this invention which derives the two least significant digits.

FIG. 4 is a final stage for a stage by stage encoder employing just two feedback paths but capable of obtaining, in accordance with this invention, the last two digits of the output signal. The circuit employs an operational amplifier 90 having an input 91 and an output 92. A first of the two feedback paths comprises the series connection of a diode 93 and a resistor 94 with the diode poled to conduct when the output of the amplifier is positive. The second feedback path comprises a diode 95 and a resistor 96 connected between the output terminal 92 and the input terminal 91 of amplifier 90. Diode 95 is poled to conduct when the output of amplifier 90 is negative. A diode 97 having its anode connected to the anode of diode 93 and its cathode connected to the cathode of diode 95 operates in conjunction with a positive voltage source 98 and a resistor 99, connected to the junction of diodes 93 and 97, to provide a proper bias on the feedback diodes 93 and 95 so that these diodes conduct only after the bias voltage has been overcome. The circuit is, aside from its biasing arrangement, similar to that disclosed in the above mentioned Waldhauer patent and a first digit output signal is obtained at output terminal 100 which is connected to the cathode and the anode of diode 97 by resistors 101 and 102 respectively.

In accordance with this invention a second digit output signal is derived from the signals present at terminals 105 and 106 which are the common junctions of the diodes and resistors in each of the two feedback networks. Feed-forward diodes 107 and 108 connect output terminals 105 and 106 respectively to the input of a comparator circuit 110, which may comprise the tandem connection of a differential amplifier and a bistable circuit. The signals applied to the comparator which are shown in FIG. 4 are identical in effect to the signals which would be derived from an additional stage of a conventional balanced encoder employing binary stages and therefore the comparator produces the same digit output signal as would such a succeeding conventional stage. The biasing networks, which comprise sources 111 and 112 respectively connected to the cathode of diode 107 and anode of diode 108 by means of resistors 113 and 114, provide just enough bias to render the last digit output circuit bistable.

Thus, in accordance with the present invention the digits of the encoded signal which heretofore have been generated by the last two or three stages of a stage by stage encoder are generated by a single stage employing only one precision operational amplifier. The cost of the associated differential amplifier utilized in accordance with the present invention is much less than the stages eliminated by using a final stage embodying the present invention resulting in a substantial cost saving.

It is to be understood that the above described arrangements are merely illustrative of the principles of the invention. Numerous other arrangements may be devised by those skilled in the art without departing from the spirit and scope of the invention.

What is claimed is:

1. A final stage for a balanced stage by stage encoder said encoder having a next to last stage with at least one analog output terminal comprising, in combination, an analog input terminal connected to the analog output terminal of said next to last stage, at least two analog output terminals and a digit output terminal, an amplifier having an input and an output connected between said analog input terminal and said digit output terminal, at least two circuit paths each including the series connection of a resistance and a unidirectional conducting device connected between said analog input terminal and said digit output terminal, circuit means connecting the junction of each said resistance and said unidirectional conducting device to a respective one of said analog output terminals, at least one differential amplifier having a pair of input terminals with each terminal connected to a respective one of said analog output terminals and an output terminal, and a bistable circuit connected to the output of said differential amplifier to generate a signal of one polarity when the signal at a first of said analog output terminals is of a first polarity with respect to the signal at a second of said analog output terminals and to generate a signal of a second polarity when the polarity of the signal at the first analog output terminal is negative with respect to the signal at the second analog output terminal.

2. A final stage for a balance stage by stage encoder having a next to last stage with at least one analog output terminal comprising, in combination, an analog input terminal connected to the analog output terminal of said next to last stage, four analog output terminals and a digit output terminal, an amplifier having an input, and an output connected between said analog input terminal and said digit output terminal, four circuit paths each including at least the series connection of a resistance and a unidirectional conducting device connected between said analog input terminal and said digit output terminal, circuit means connecting the junction of each said resistance and each said unidirectional conducting device to a respective one of said analog output terminals, to differential amplifiers each having a pair of input terminals and an output terminal with each input terminal connected to a respective one of said analog output terminals, a first bistable circuit connected to said digit output terminal, a second bistable circuit having an input and an output said input being connected to the output of a first of said differential amplifiers to generate a signal at said output of said bistable circuit of one polarity when the signal at a first of said analog output terminals is of a first polarity with respect to the signal at a second of said analog output terminals and to generate a signal of a second polarity when the polarity of the signal at the first analog output terminal is negative with respect to the signal at the second analog output terminal, and a third bistable circuit having an input and an output said input being connected to the output of the second differential amplifier to generate a signal of one polarity when the signal at a third of said analog output terminals is of a first polarity with respect to the signal at a fourth of said analog output terminals and to generate a signal of a second polarity when the polarity of the signal at the third analog output terminal is negative with respect to the signal at the fourth analog output terminal.

3. A final stage for a balanced stage by stage encoder having a next to last stage with at least one analog output terminal comprising, in combination, an amplifier having an input terminal and an output terminal said amplifier input terminal being connected to the analog output terminal of said next to last stage, a digit output terminal at which a first digit output signal is obtained connected to said amplifier output terminal, two diodes, a first of said diodes having its cathode connected to the output terminal of said amplifier and the second of said diodes having its anode connected to the output terminal of said amplifier, first and second feedback paths connected between said amplifier input terminal and the anode of said first diode, each of said first and said second feedback paths comprising the series combination of a diode and a resistance with the diode in the first path poled to conduct current in the opposite direction from the diode in said second path, third and fourth feedback paths each comprising the series combination of a diode and a resistor connected between said amplifier input terminal and the cathode of said diode whose anode is connected to the amplifier output terminal, the diode in said third feedback path being poled to conduct current in the opposite direction from the diode in said fourth feedback path, means for deriving a fourth analog signal from the the junction of said resistor and said diode of said first fieedback path, means for deriving a second analog signal from the cathode of said diode of said second path, means for deriving a third analog signal from the junction of said resistor and said diode of said third feedback path, means for deriving a fourth anolog signal from the anode of said diode in said fourth feedback path, means for deriving a fifth analog signal from the junction of said resistor and said diode in said second feedback path, means for deriving a sixth analog signal from the junction of said resistor and said diode in said fourth feedback path, means for combining the first and fifth analog signals to form a seventh analog output signal, means for combining said second and sixth analog signals to form an eighth analog output signal, a first bistable circuit connected to said digit output terminal, a first differential amplifier connected to receive said second and fourth analog output signals, a second bistable circuit connected to the output of said first differential amplifier to generate the second least significant digit, a second differential amplifier connected to receive said seventh and eighth analog signals, and a third bistable circuit connected to the output of said second differential amplifier to generate a signal of one polarity when the seventh analog output signal is of a first polarity with respect to said eighth analog signal and to generate a signal of a second polarity when said seventh analog signal is negative with respect to said eighth analog signal.

4. A final stage for a balanced stage by stage encoder having a next to last stage having at least one analog output terminal comprising, in combination an analog input terminal connected to the analog output terminal of said next to last stage, two analog output terminals and a digit output terminal, an amplifier having an input and an output connected between said analog input terminal and said digit output terminal, two circuit paths each comprising the series connection of a resistance and a unidirectional conducting device connected between said analog input terminal and said digit output terminal, biasing means connected to said digit output terminal, means connecting the junction of each said resistance and each said unidirectional conducting device to a respective one of said analog output terminals, a differential amplifier having a pair of input terminals and an output terminal with each input terminal connected to a respective one of said analog output terminals, a first bistable circuit connected to said digit output terminal, a second bistable circuit connected to the output of said differential amplifier to generate a signal of one polarity when the signal at a first of said analog output terminals is of a first polarity with respect to the signal at the second of said analog output terminals and to generate a signal of a second polarity when the polarity of the signal at the first analog output terminal is negative with respect to the signal at the second analog output terminal.

References Cited

UNITED STATES PATENTS 3,329,950 7/1967 Shafer ------------ 340—347

MAYNARD R. WILBUR, Primary Examiner

CHARLES D. MILLER, Assistant Examiner

U.S. Cl. X.R.

330—110